United States Patent
Pinney, Jr. et al.

[11] Patent Number: 5,291,664
[45] Date of Patent: Mar. 8, 1994

[54] CORNER TO CORNER TAPE MEASURE APPARATUS

[76] Inventors: Richard D. Pinney, Jr., 30 David Dr., East Haven, Conn. 06512; Lisa L. Misbach, 133 Forest Rd., W. Haven, Conn. 06576

[21] Appl. No.: 17,594

[22] Filed: Feb. 16, 1993

[51] Int. Cl.[5] .............................................. G01B 3/10
[52] U.S. Cl. ........................................ 33/770; 33/768; 33/485
[58] Field of Search ................. 33/759, 765, 766, 768, 33/770, 755, 760, 761, 484, 485

[56] References Cited

U.S. PATENT DOCUMENTS

| | | | |
|---|---|---|---|
| 653,229 | 7/1900 | Gamble | 33/485 |
| 3,509,631 | 5/1970 | Shimoyama | 33/761 X |
| 3,744,134 | 7/1973 | Zima, Jr. | 33/768 |
| 5,172,846 | 12/1992 | Waldherr | 33/768 X |

FOREIGN PATENT DOCUMENTS 2233097 1/1991 United Kingdom ................. 33/755

OTHER PUBLICATIONS

*American Machinist*, Aug. 30, 1945. p. 113. "Short Cuts for the Small Shop" by A. H. Waychoff.

*Primary Examiner*—William A. Cuchlinski, Jr.
*Assistant Examiner*—Alvin Wirthlin
*Attorney, Agent, or Firm*—Leon Gilden

[57] ABSTRACT

A tape strip is arranged to include a strip abutment and the strip abutment is positioned within a first sleeve, the first sleeve having a V-shaped web arranged for positioning as a first corner, with a second sleeve having a second V-shaped web arranged for abutting against a further spaced corner, with the second sleeve including a slide block to receive the tape member therethrough.

3 Claims, 4 Drawing Sheets

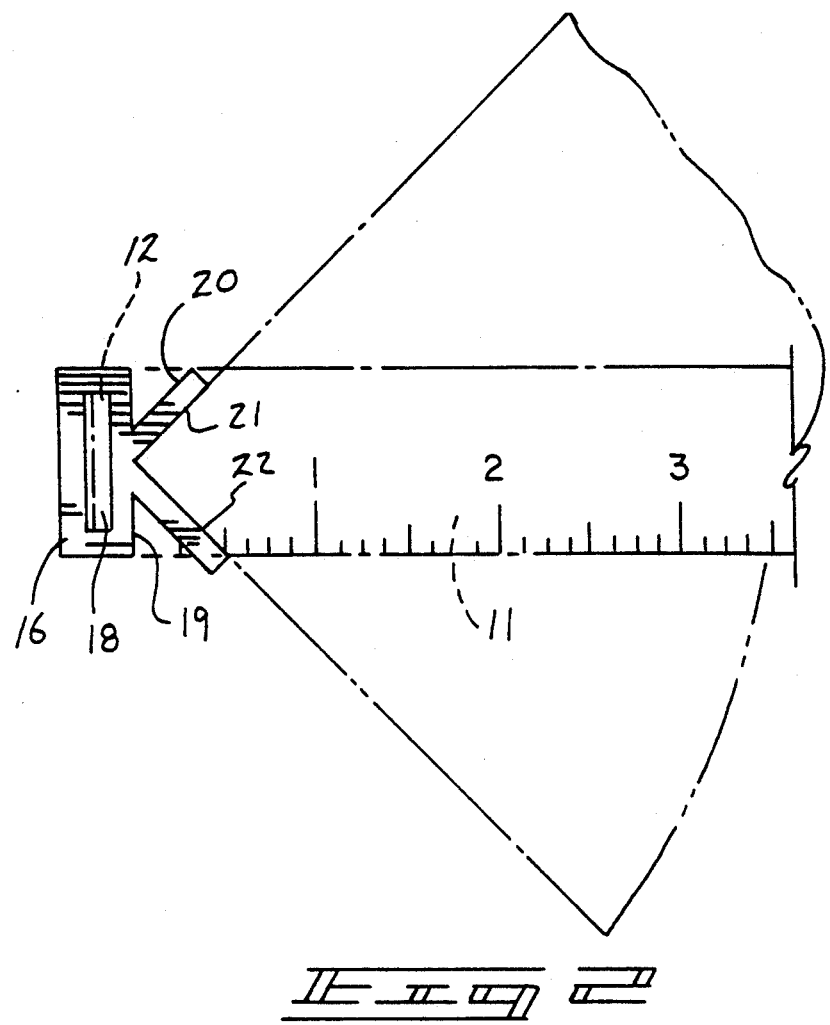
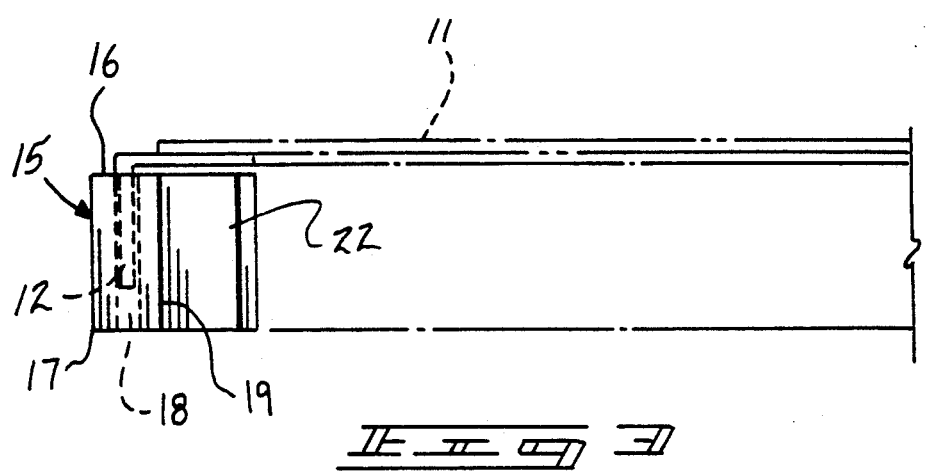

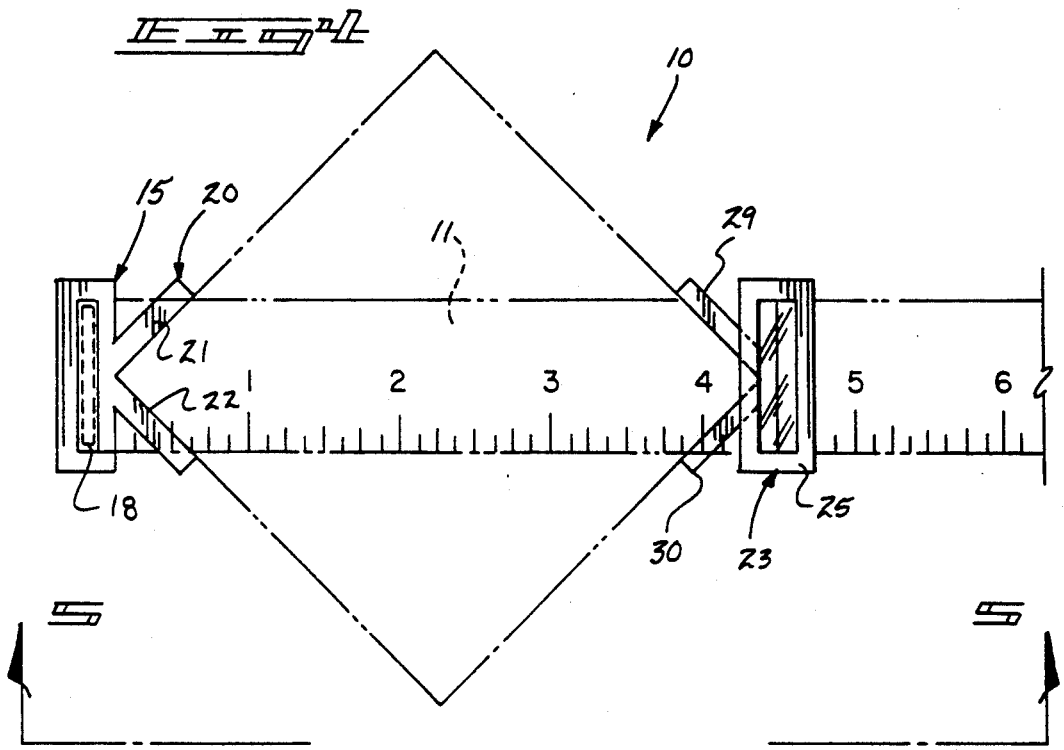
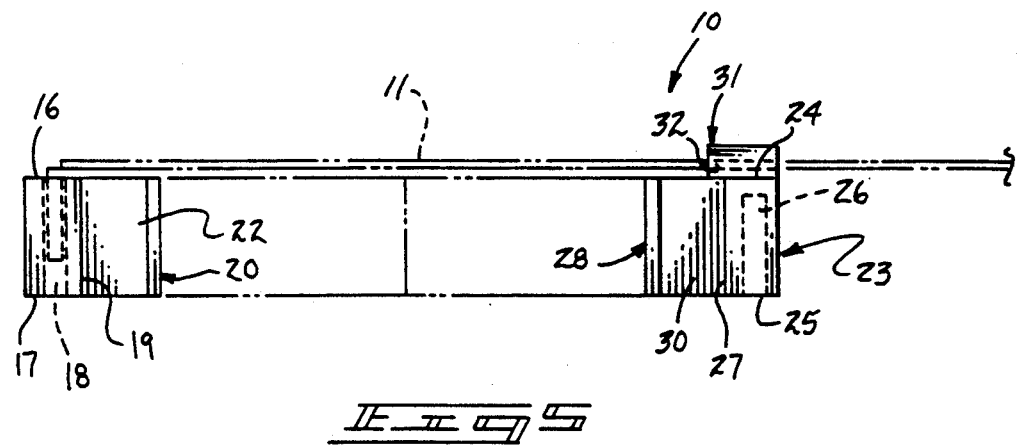

CORNER TO CORNER TAPE MEASURE APPARATUS

BACKGROUND OF THE INVENTION

1. Field of the Invention

The field of invention relates to tape measure apparatus, and more particularly pertains to a new and improved corner to corner tape measure apparatus wherein the same is arranged to accurately measure distances between spaced corners of a workpiece.

2. Description of the Prior Art

Tape measure structure of various construction is indicated in the prior art and set forth by example in U.S. Pat. Nos. 5,010,657; 5,038,985; 3,473,235; and 4,827,622.

The prior art has heretofore failed to provide for structure to permit the ease of measuring of corner to corner distances between various positions of a workpiece and in this respect, the present invention substantially fulfills this need.

SUMMARY OF THE INVENTION

In view of the foregoing disadvantages inherent in the known types of tape measure apparatus now present in the prior art, the present invention provides a corner to corner tape measure apparatus wherein the same employs confronting V-shaped webs to accommodate opposed corner portions of a workpiece to permit measuring therebetween. As such, the general purpose of the present invention, which will be described subsequently in greater detail, is to provide a new and improved corner to corner tape measure apparatus which has all the advantages of the prior art tape measure apparatus and none of the disadvantages.

To attain this, the present invention provides a tape strip arranged to include a strip abutment and the strip abutment is positioned within a first sleeve, the first sleeve having a V-shaped web arranged for abutting against a further spaced corner, with the second sleeve including a slide block to receive the tape member therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corner to carrier tape measure apparatus which has all the advantages of the prior art tape measure apparatus and none of the disadvantages.

It is another object of the present invention to provide a new and improved corner to corner tape measure apparatus which may be easily and efficiently manufactured and marketed.

It is a further object of the present invention to provide a new and improved corner to corner tape measure apparatus which is of a durable and reliable construction.

An even further object of the present invention is to provide a new and improved corner to corner tape measure apparatus which is susceptible of a low cost of manufacture with regard to both materials and labor, and which accordingly is then susceptible of low prices of sale to the consuming public, thereby making such corner to corner tape measure apparatus economically available to the buying public.

Still yet another object of the present invention is to provide a new and improved corner to corner tape measure apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic top view of the first sleeve block.

FIG. 3 is an orthographic side view of the first sleeve block.

FIG. 4 is an isometric illustration of the tape strip employing a first and second sleeve.

FIG. 5 is an orthographic view, taken along the lines 5—5 of FIG. 4 in the direction indicated by the arrows.

DESCRIPTION OF THE PREFERRED EMBODIMENT

Figure 1:
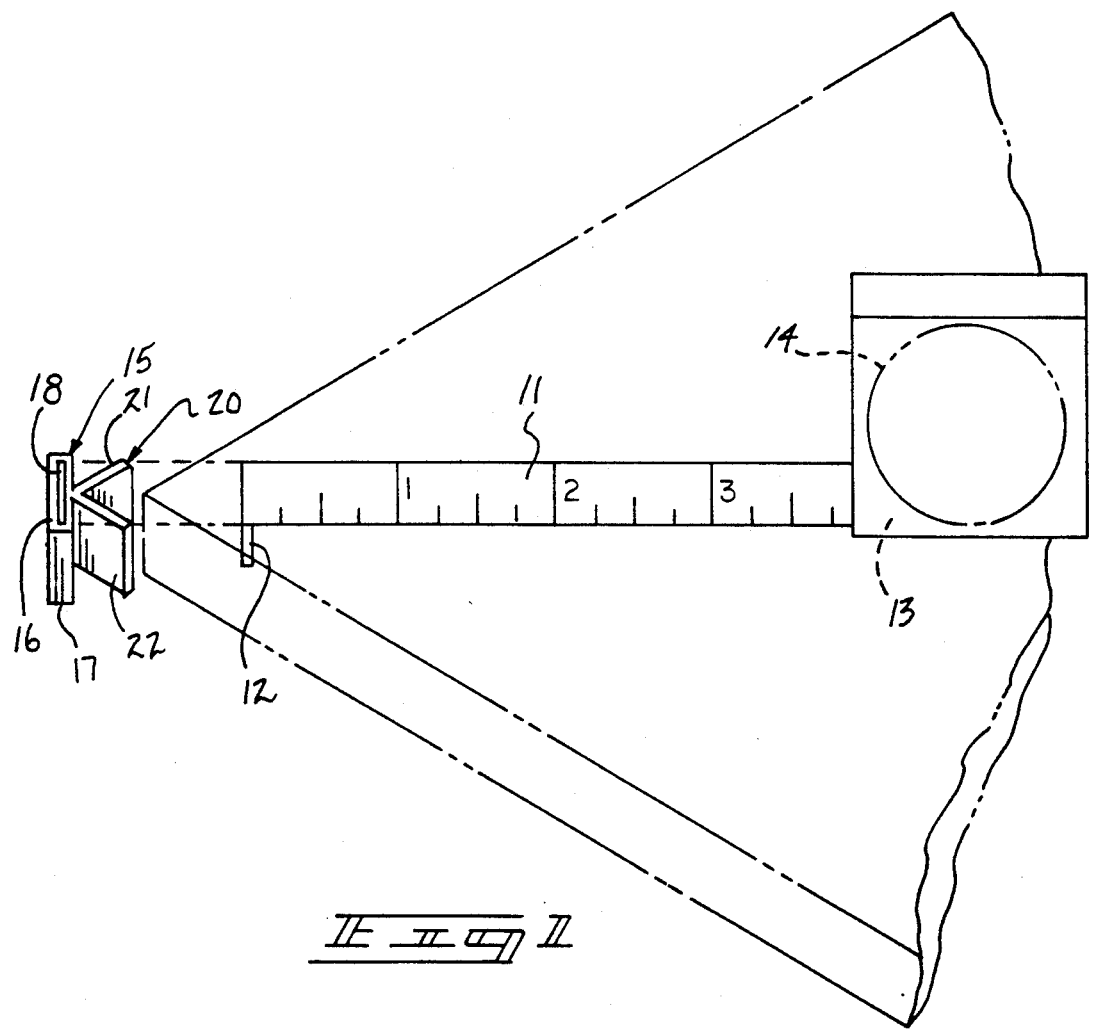
FIG. 1 is an isometric illustration of the invention employing a first sleeve portion.
Figure 6:
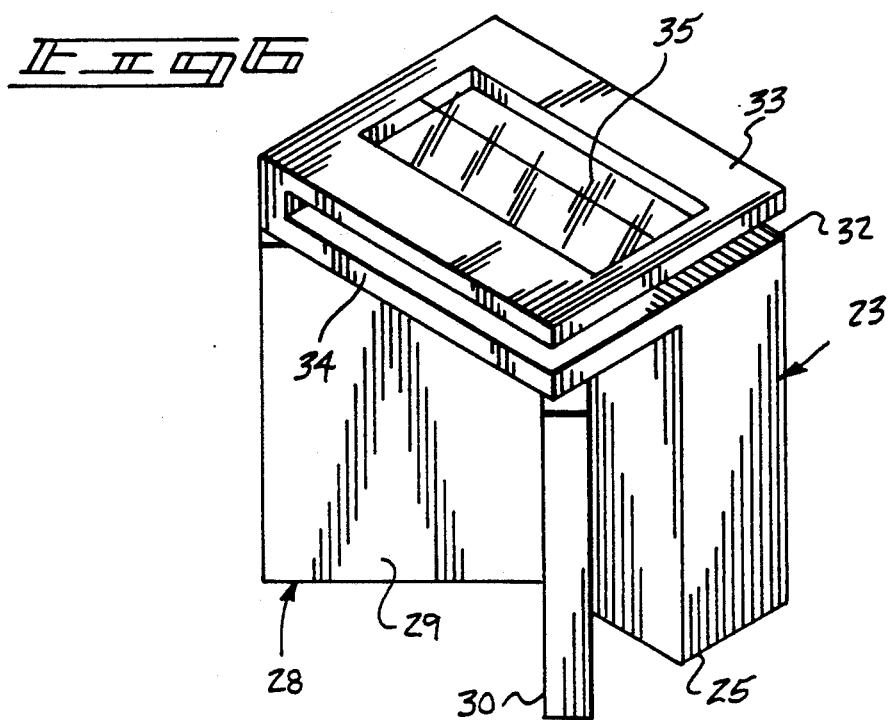
FIG. 6 is an isometric illustration of the second sleeve block structure of the invention.

With reference now to the drawings, and in particular to FIGS. 1 to 7 thereof, a new and improved carrier to corner tape measure apparatus embodying the principles and concepts of the present invention and generally designated by the reference numeral 10 will be described.

More specifically, the corner to corner tape measure apparatus 10 of the instant invention essentially comprises a tape strip 11, having a tape strip abutment 12 orthogonally oriented relative to the tape strip 11 at its free distal end, with the tape strip 11 arranged for winding within a housing 13 as a tape roll 14 within the housing, as indicated in FIG. 1.

A first sleeve 15 is provided having a first sleeve first end 16 spaced from a first sleeve second end 17, with a first slot 18 directed from the first sleeve first end 16 to the first sleeve second end 17. The first sleeve includes a first sleeve forward side wall 19 mounting a first V-shaped web 20 thereto, wherein the first V-shaped web 20 includes a first web first flange 21 and a first web second flange 22 defining an acute included angle therebetween, with the first V-shaped web 20 extending between the first sleeve first end to the first sleeve second end along the first sleeve forward side wall 19. The FIGS. 4 and 5 indicate the apparatus to include a second sleeve 23 having a second sleeve first end 24 and a second sleeve second end 25, with a second slot 26 directed into the second sleeve 23 from the second end 25. A second sleeve forward wall 27 mounts a second V-shaped web 29 that extends from the second sleeve first end 24 to the second sleeve second end 25, with a second web first flange 29 and a second web second flange 30 intersecting on the second sleeve forward wall 27 defining said acute angle therebetween. A slide block 31 is mounted to the second sleeve first end 24 having a slide block slot 32 to receive the tape web frictionally therewithin, with the slide block slot 32 orthogonally oriented relative to the second slot 26, and the second sleeve forward wall 27. The slide block 31 includes a first plate 33 spaced from a second plate 34 defining the second slide block slot 32 therebetween, with the first plate 33 having a magnification lens 35 extending to overlie the second V-shaped web 28 where it intersects the second sleeve forward wall 27.

Figure 7:
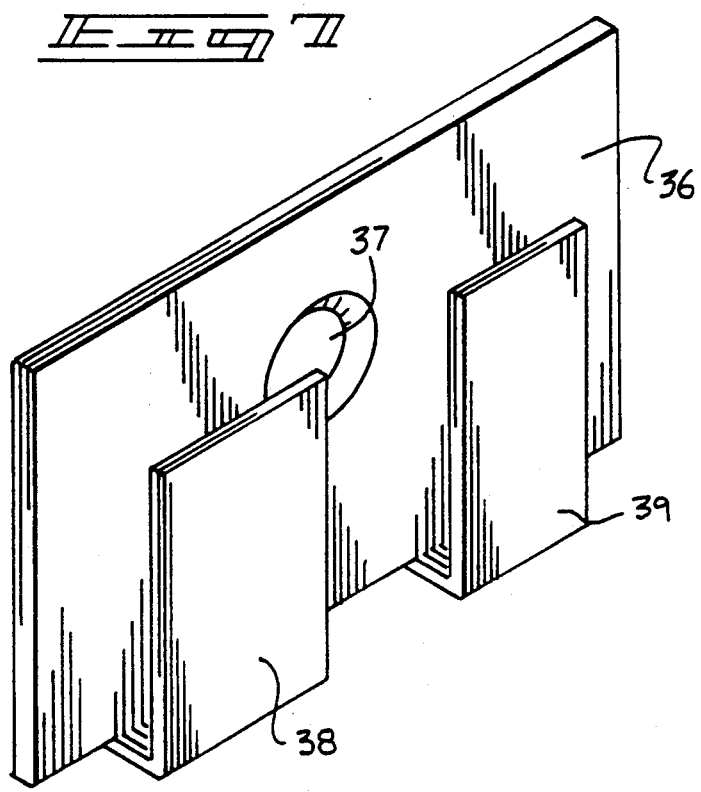
FIG. 7 is an isometric illustration of a support plate structure arranged for mounting to the tape strip housing of the invention.

The FIG. 7 indicates the use of a support plate 36, having an aperture 37 permitting a fastener projected through the aperture 37 to mount the support plate 36 to the tape strip housing 13. First and second L-shaped plates 38 and 39 mounted to the support plate 36 are arranged to receive the first and second slots 18 and 26 of the respective first and second sleeves 15 and 23 for ease of positioning and mounting the slide block structure during periods of non-use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A corner to corner tape measure apparatus, comprising:

a tape strip, the tape strip including a tape strip abutment, the tape strip abutment arranged for reception within a housing, and wherein the apparatus further includes a first sleeve arranged to receive the tape strip abutment, the first sleeve having a first sleeve first end spaced from a first sleeve second end, and a first slot directed through the first sleeve from the first end to the second end, and the first sleeve having a first sleeve forward side wall extending between the first sleeve first end and the first sleeve second end, and the first sleeve forward side wall having a first V-shaped web mounted to the first sleeve forward side wall, wherein the first V-shaped web includes a first web flange and a second web flange defining an acute angle therebetween for receiving a workpiece, and a second sleeve, the second sleeve having a second sleeve first end and a second sleeve second end, and a second slot directed into the second sleeve from the second sleeve second end, with the second slot spaced from the second sleeve first end, and the second sleeve having a second sleeve forward wall, and a second V-shaped web mounted to the second sleeve forward wall, with the second V-shaped web including a second web first flange and a second web second flange defining said acute angle therebetween, and a slide block, the slide block having a slide block slot receiving the tape strip therewithin, with the slide block mounted to the second sleeve first end.

2. An apparatus as set forth in claim 1 wherein the slide block includes a second plate mounted to the second sleeve first end, and a first plate spaced from the second plate, with the slide block slot oriented between the second plate and the first plate, and the first plate having a magnification lens directed through the first plate extending over the second V-shaped web intersecting the second sleeve forward wall.

3. An apparatus as set forth in claim 2 including a support plate, the support plate arranged for securement to the tape strip housing, and the support plate including a first L-shaped plate for projection into the first slot and a second L-shaped plate arranged for projection within the second slot.

* * * * *